UNITED STATES PATENT OFFICE.

IRA HOLMES, OF LEICESTER, NEW YORK.

IMPROVEMENT IN FILTERING-SAND FOR CIDER.

Specification forming part of Letters Patent No. 15,517, dated August 12, 1856.

*To all whom it may concern:*

Be it known that I, IRA HOLMES, of the town of Leicester, county of Livingston, and State of New York, have discovered a new and useful Art or Mode of Making Beverage, Sirup, and Molasses from Apples; and I do hereby declare that the following is a full and exact description of my discovery and process.

To enable others skilled in the art to use my discovery and process, I will proceed to describe the nature of my discovery and the process by which I accomplish the end proposed.

The nature of my discovery consists in this, that by a certain process, hereinafter described, I am enabled to make from apples an excellent beverage, molasses, and sirup equal, if not better, than the molasses and sirup made from the sugar or sugar-cane, and much cheaper, and equally nutritious and healthy, and which can be made in any state and by any farmer from the fruit of his own orchard at any time during the continuance of the season of apples.

In order to make my beverage No. 1, I first obtain the cider or juice of the apples in the ordinary manner of making cider. I then prepare a filter, which is made by taking any vessel of the size required with holes in the bottom, over which I fasten a piece of flannel cloth to prevent the sand which is spread over it from passing. This sand is spread to the depth of from one to four inches, or more or less, according to the quantity I wish to filtrate. This sand I have had carefully examined and analyzed, and find it to contain about silica, eighty; alumina, one; carbonate of lime, two; black oxide of iron, six; titaniferous iron, three; peroxide of iron, eight. The use of this sand is a very important part in my discovery and process, and I have not been able to find any other sand that will produce the same results, although I have tried more than twenty different kinds; nor can I do the same by a combination of the analyzed parts. The sand is found in Leicester, Livingston county, State of New York, in great quantity about one hundred and fifty rods from the Genesee river. The cider is poured into the filter and allowed to filtrate gradually through the above sand, and when it has passed through the same it has been entirely changed in its chemical proportions, and the acid cider is changed into one entirely of a saccharine character. Whether the chemical action of the sand on the cider is the conversion of the acid into saccharine is more than I am able to affirm as a positive fact, yet when the cider has passed through the filter the acidity has disappeared and the saccharine has increased very perceptibly. This is a fact which I have fully tested. I then put into the cider thus changed about three-fourths of an ounce of animal charcoal to the gallon, stirring it well to thoroughly mix, which I let stand about six hours. I then draw it off or filter it through the filter. This is to get out the charcoal. I then clarify by putting into it the whites of eggs, well beaten, or bullock's blood sufficient to cause the particles to rise to the top, that they may be skimmed off. I evaporate it about one-eighth, after which I put into it a small portion of acetic acid and oil of lemon, well cut, according to taste and flavor desired, and add sufficient alcohol to preserve it from fermentation. This is No. 1, or the prepared beverage.

In order to make molasses or sirup, or No. 2, I continue the operation of evaporation as described, omitting to put the acid, oil of lemon, and alcohol in it, until I have reduced it to the strength and consistency desired for molasses or sirup and to preserve it. I find it can be made to a consistency and strength equal to any other sirup or molasses, and can be made much cheaper. I also expect to greatly increase in the market a good saccharine article fitted for the table and other purposes.

Having thus fully described the nature of my discovery, art, or process, I do not claim making cider from apples, nor do I claim simply evaporating cider by boiling; but

What I do claim as new, and desire to secure by Letters Patent, is—

The herein-described discovery and process for making a beverage and sirup from the juice of apples, as set forth in my specification.

IRA HOLMES.

Witnesses:
T. G. CLAYTON,
J. C. CLAYTON.